J. GRÜNBERG.
SYMMETROSCOPE.
APPLICATION FILED JAN. 25, 1912.

1,232,290.

Patented July 3, 1917.
3 SHEETS—SHEET 1.

WITNESSES
William Conway
Wm. J. Russell

INVENTOR
Josef Grünberg
BY Edward F. Simpson, Jr.
ATTORNEY

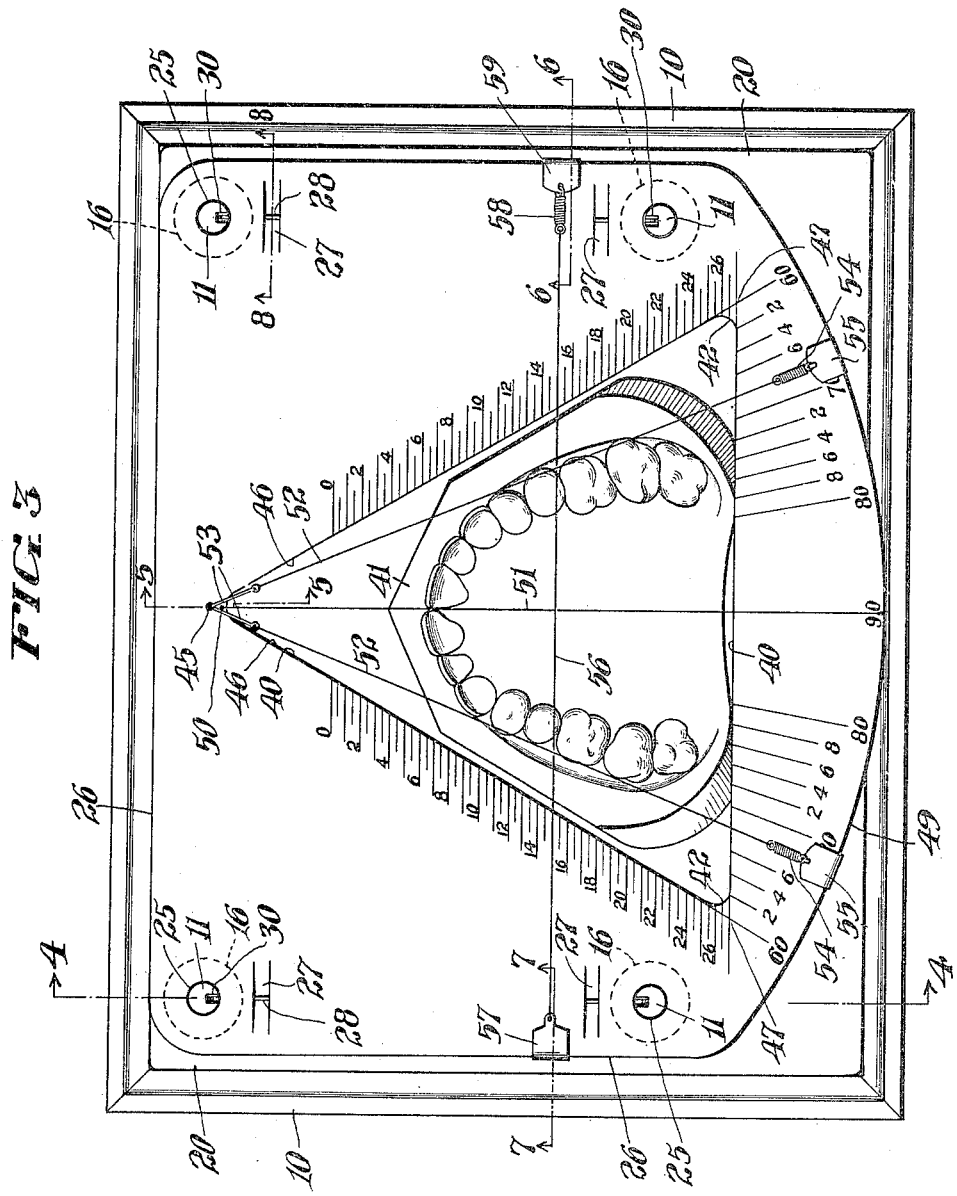

J. GRÜNBERG.
SYMMETROSCOPE.
APPLICATION FILED JAN. 25, 1912.
1,232,290.
Patented July 3, 1917.
3 SHEETS—SHEET 3.
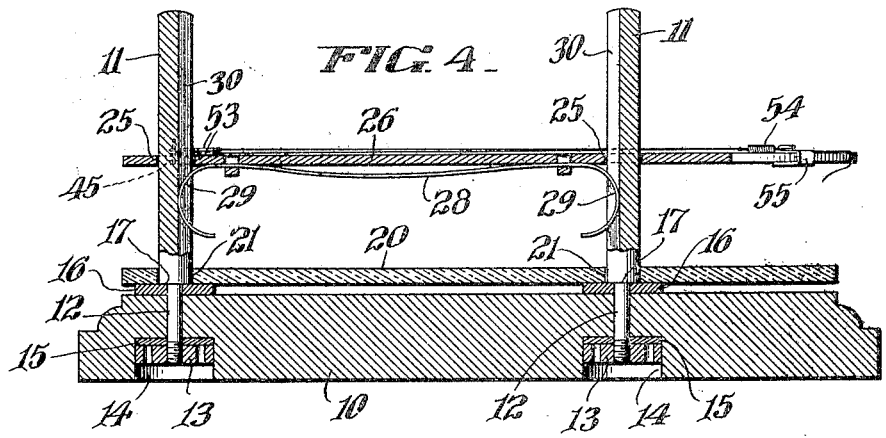
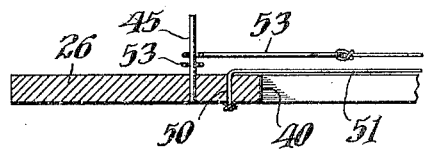
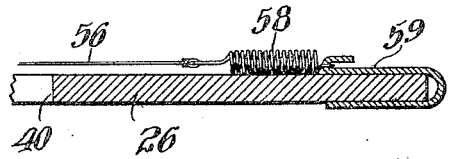
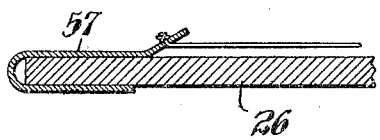
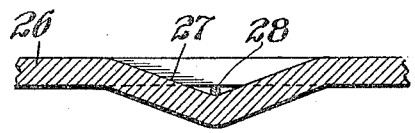
WITNESSES
William Conway
Wm J. Russell
INVENTOR
Josef Grünberg
BY Edward J. Simpson, Jr.
ATTORNEY

UNITED STATES PATENT OFFICE.

JOSEF GRÜNBERG, OF BERLIN, GERMANY.

SYMMETROSCOPE.

1,232,290.  Specification of Letters Patent.  Patented July 3, 1917.

Application filed January 25, 1912. Serial No. 673,375.

*To all whom it may concern:*

Be it known that I, JOSEF GRÜNBERG, a subject of the Emperor of Russia, residing in Berlin, Germany, have invented a certain new and useful Symmetroscope, of which the following is a specification.

In the practice of orthodontia, orthodontists should first examine carefully the teeth to ascertain all the information possible as to the conformation of the dental arches, the position of the teeth therein, the relation of the upper and lower arches to each other and all other information possible to obtain from such inspection and examination.

In order, however, that the proper study of a dental arch may be carried on, it is not only customary but necessary that a model thereof be made. The manner of securing and making such model is well known to those skilled in the science to which this invention relates and need not be described.

After the model is made it is carefully studied. Heretofore it has been the practice of orthodontists, and of those who have not specialized as orthodontists but who have from time to time undertaken to do the work of such specialists, to inspect the model and determine from such inspection the condition of the arch. The object of such inspection is to ascertain whether the portions of the arch upon opposite sides of its median plane are symmetrical or asymmetrical with respect to each other.

If as a result of such inspection the conclusion were reached that the teeth in the arch were malposed it then became necessary to determine from such inspection the amount and direction of malposition.

To determine the amount of such displacement from a mere inspection without any definite guide has been and is a most difficult and serious problem.

My invention relates to means which I have invented and designed for the purpose of meeting the difficulty thus presented which means I have denominated a symmetroscope.

One of the objects of my invention is to provide means which is adapted to be employed in connection with a model of a dental arch for the purpose of indicating whether the two portions of such arch upon opposite sides of its median plane are symmetrical with respect to each other or whether they are asymmetrical.

Another object of my invention is to provide means for ascertaining not only the direction of displacement when the teeth of a dental arch are in malposed position but also the amount of such displacement.

A further object of my invention is to ascertain whether or not the occluding portions of the teeth of a dental arch occupy the same horizontal plane.

By the employment of my invention it may be determined with exactness and accuracy whether or not the teeth upon opposite sides of the median plane of an arch are situated in relatively the same positions and whether or not their occluding ends occupy the same horizontal plane, whereas without the use of my invention and by inspection only the determination is no more accurate than the accuracy of judgments and conclusions which may be based only on visual inspection.

In order that the work of an orthodontist shall be both scientific and efficient it is necessary that the same be done with the greatest of accuracy and that nothing shall be left to a judgment based upon so uncertain a guide as the unaided eye.

I have not undertaken to set forth and specify all of the various objects and advantages of my invention but the same will be referred to in the detailed description of my invention which follows or will be apparent therefrom.

In order that my invention may be more easily and better understood reference should be had to the accompanying drawings in which convenient forms of embodiment thereof are illustrated and in which,—

Fig. 3 is a top plan view of another form of embodiment of my invention and also showing a model of a dental arch in position to be studied;

Fig. 4 is a transverse section on the line 4—4 of Fig. 3, the model being omitted;

Fig. 5 is a section on the line 5—5 of Fig. 3;

Fig. 6 is a section on the line 6—6 of Fig. 3;

Fig. 7 is a section on the line 7—7 of Fig. 3; and

Fig. 8 is a section on the line 8—8 of Fig. 3.

In the practical embodiment of my invention and as the same is illustrated in the accompanying drawings, I provide means whereby the model of a dental arch may be placed in such position with relation to the median line and the sides of an isosceles triangle that the positions of the portions of the dental arch upon opposite sides of its median plane may be compared readily and accurately with the sides of such triangle and the relative positions of the portions of the dental arch with respect to each other thereby accurately determined.

In comparing the arch with the sides of an isosceles triangle the model should be placed so that the median plane of the arch is coincident with the median line of such triangle and the model should also be so positioned that the lateral teeth of the arch extend as nearly as possible in the same angular direction as the sides of the triangle. In practice I draw a number of lines from the same vertex upon opposite sides of the median line and forming equal angles therewith so that there may be a plurality of lines with which to compare the teeth upon opposite sides of the median plane of the arch.

A comparison of the teeth upon opposite sides of the median plane with the sides of the isosceles triangles will indicate whether they are in symmetrical position or whether there is any displacement or deviation and if so the amount of such displacement or deviation is apparent.

A plurality of base lines may be drawn at right angles to the median line common to the several isosceles triangles to which reference has already been made which base lines may be compared with the teeth upon opposite sides of the median plane of the arch for the purpose of determining homologous points upon homologous teeth upon opposite sides of the arch. The position of such points with relation to a base line will indicate to the skilled orthodontist whether or not a particular tooth is in malposed position and if malposed whether displaced mesially or distally.

Figure 1:
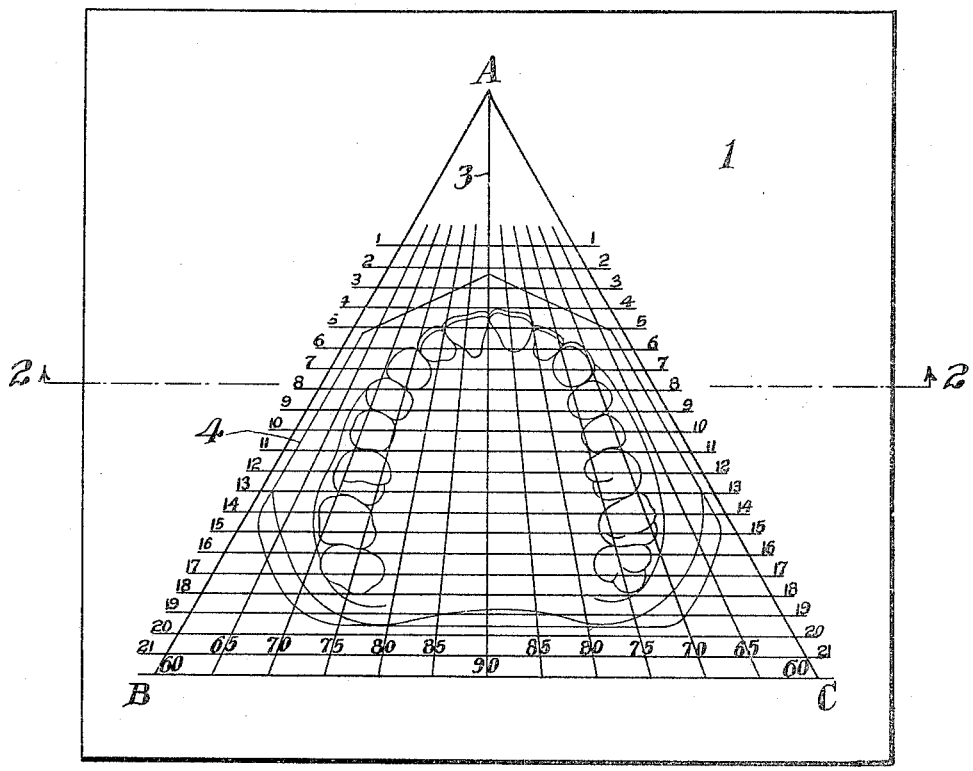
Figure 1 is a top plan view of a device embodying my invention associated with the model of a dental arch for the purpose of illustrating the manner of its use.
Figure 2:
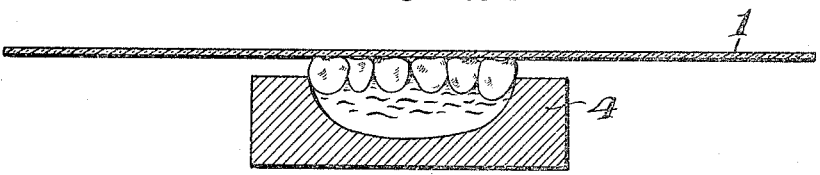
Fig. 2 is a transverse section on the line 2—2 of Fig. 1.

In the embodiment of my invention illustrated in Figs. 1 and 2 of the drawings, I employ a transparent member 1, preferably of material not easily broken, having lines thereon forming an equilateral triangle A—B—C, the vertex of which is at A. The median line of the said triangle is indicated at 3 and cuts the base line thereof at the point marked 90 degrees. Intermediate the sides of the triangle A—B—C and upon opposite sides of the median line 3 I have drawn other lines from the vertex A to the base B—C. The said lines upon opposite sides of the median line cut the base line at the points marked 65, 70, 75, 80 and 85 degrees.

I have also drawn a number of lines across the said triangle parallel to the base line B—C. In Fig. 1 of the drawings I have shown twenty-one of these lines, but it will be understood that the number may be increased or diminished within limits as desired as may also the number of lines drawn from the vertex A upon opposite sides of the median line 3 to the base of the triangle.

Any two corresponding lines drawn from the vertex A upon opposite sides of the median line 3 with the base line or with any one of the lines drawn parallel thereto constitutes an isosceles triangle.

I have shown the device as described associated with a model 4 of a dental arch. The said device is shown as resting upon the tops of the teeth of such model.

In the use of the device illustrated in Figs. 1 and 2 it is so placed with respect to the model that the median line 3 is located in a plane which extends between the central incisors and also so that the buccal sides of the lateral teeth upon opposite sides of the arch extend as nearly as possible in the same direction as the two lines drawn from the vertex A upon opposite sides of the median line 3 which most nearly correspond in position therewith,—care being exercised, however, first to find two homologous teeth which are intersected at homologous points by said lines. By comparing the lateral teeth upon opposite sides of the arch with these lines it may be determined accurately whether or not any of the teeth deviate lingually or buccally from their proper position. This having been done it may be then determined whether or not the teeth are malposed either mesially or distally by comparing the same with the several transverse lines which are parallel to the base line B—C of the triangle.

If it be found that the several lines drawn from the vertex A upon opposite sides of the median line 3 of the triangle intersect homologous teeth at homologous points and if it also be found that the several transverse lines parallel to the base line B—C of the triangle also intersect homologous teeth at homologous points, we have convincing proof that the arch is symmetrical.

It is obvious, therefore, that if the teeth are malposed such malposition may be readily discerned when examined by means of the device illustrated in Figs. 1 and 2 and furthermore that the amount of such malposition may be determined with substantial accuracy and the treatment for correction determined by the orthodontist with intelligence and precision.

While the device illustrated in Figs. 1 and 2 is very efficient and is a great improvement over the old method which heretofore has been practised in which questions as to the symmetry or asymmetry of the dental arch were determined by inspection only, it possibly does not respond to all of the requirements necessary to meet any and all of the conditions presented in the various subjects which from time to time may be under study and treatment.

In Figs. 3 to 8 of the drawings I illustrate another form of embodiment of my invention which responds to all of the requirements met with in practice.

In these figures, 10 designates a base member having four posts 11 secured thereto in any suitable manner. As illustrated, these posts are provided with reduced end portions 12 which project through the base member. The lower ends of these posts are screw-threaded and engage nuts 13 located in recesses 14 formed in the under side of the base 10. Washers 15 are interposed between the nuts 13 and the bottoms of the said recesses 14.

The reduced portions 12 of the posts 11 extend through washers 16 located upon the top of the base 10 and shoulders 17 upon the said posts rest upon said washers 16.

A plate 20, (which may be of glass) having holes 21 in proximity to its four corners and through which the posts 11 extend, rests upon the washers 16.

The posts 11 also extend through holes 25 in a plate 26 which is supported thereon. The plate 26 is provided at its opposite ends with strips 27 each of which is formed by cutting a couple of slits in the said plate parallel and adjacent to each other, as illustrated in Fig. 3 of the drawings. These strips are bent out of the plane of the plate 26 so as to project beyond the under side thereof. Straight wire springs 28 are located upon the underneath side of the plate 26 and are inserted underneath the said strips, that is, between the same and the plate 26 and are held in position by such strips. The opposite ends of the said springs are bent as indicated at 29 for the purpose of forming suitable bearings which engage the bottoms of slots 30 formed in the opposing sides of the two posts at the opposite ends of the base 10.

Although I have illustrated the strips 27 and the wire springs 28 as being located underneath the plate 26, I desire it to be understood that these parts may be located so as to be upon the top side of the plate 26. This construction, however, is not preferred because it would take away very much from the neatness of appearance of the symmetroscope.

It will be understood that the plate 26 may be raised and lowered upon the posts 11 and that it is held in any position to which it may be adjusted by the springs 28, the opposite ends of which are in engagement with the bottoms of the slots 30, as stated.

The fit of the posts 11 in the holes 25 is loose so that the plate 26 may be tilted thereon so as to occupy positions inclined to a horizontal plane. This capacity of said plate may be of importance in the consideration and study of arches which are of such configuration that models made to represent them may be higher at one side or point than at an opposing side or point.

The central portion of the plate is removed to form an opening of sufficient size to accommodate models of dental arches which are to be studied, such a model being indicated at 41.

The shape of the opening 40 is substantially that of an equilateral triangle but as will be noted the corners are rounded off so as to leave portions of the metal of the plate within the area of such a triangle, as indicated at 42, at the three corners of the opening. It will be understood that the opening may be of some other shape if desired.

At 45 I have located a pin in the plate 26 which is coincident with the vertex of an equilateral triangle the sides and base of which (except very small portions at the ends thereof) are coincident with the sides and base of the triangular opening 40.

The sides 46 of the said triangle cut the base line thereof at the points 47, as shown.

But for the fact that the corners of the triangular opening in the plate 26 are rounded, as illustrated, the said opening would coincide exactly with the equilateral triangle having its vertex at 45 and the sides of which cut the base at the points 47, as stated.

The front edge 49 of the plate 26 is curved upon the arc of a circle the center of which is at 45.

51 designates a thread or a wire (which may be referred to broadly as a line) which is secured at one end in a pin hole or opening 50 in the plate 26 and the opposite end of which is secured in a narrow slot in the curved edge 49 of said plate. The said thread or wire is located in such position that it bisects the angle of the equilateral triangle at its vertex 45 or would do so if extended to the pin 45.

It follows that it not only bisects the base of said triangle but is perpendicular thereto as well as to all other lines, threads or wires which may be extended across the said plate in parallel relation to the base line of the said triangle. In the construction illustrated in Figs. 3 to 8 inclusive, such lines, threads or wires would be parallel also to the base line of the triangular opening 40 in the said plate.

52 designates threads or wires (which may be referred to broadly as lines) each of which is secured at one end to a short link 53 pivotally connected to the pin 45 and the opposite end of each of which is connected to a coiled spring 54 which is connected to a hook member 55. Both of these hook members engage the curved edge 49 of the plate 26.

It will be seen that by reason of the presence of the said coiled or tension springs 54 the threads or cords 52 are always held taut. The said threads or wires 52 are adapted to be swung about the pin 45 as a pivot into different positions with respect to the median thread or wire 51.

At the point upon the curved edge 49 of the plate 26 where the thread or wire 51 is connected thereto, I have placed the number 90 indicating 90 degrees, and upon opposite sides thereof I have placed the numbers 60, 70 and 80 indicating degrees, and intermediate these numbers other figures indicating intermediate degree numbers.

It will also be noted that lines corresponding to these numbers are formed upon the plate which lines radiate from the pin 45 which is coincident with the vertex of the equilateral triangle to which reference has been made.

The hooks 55 may be moved from point to point upon the curved edge 49 of the plate 26 and by reason of the tension exerted by the springs 54 the threads or wires 52 and said hooks 55 will remain in the positions where placed.

56 designates a thread or wire connected at one end to a hook member 57 and at opposite end to a coiled wire spring 58 which in turn is connected to a hook member 59. The hook members 57 and 59 engage the opposite edges of the plate 26, as is shown in the drawings.

This thread or wire 56 intersects the thread or wire 51 which is coincident with the median line of the equilateral triangle (the vertex of which is at 45) and is adapted to be placed in coincidence with any one of the lines 0—0, 2—2, etc., formed upon the top surface of the plate 26 and which are parallel with the base of the triangular opening 40 and also with the base of the said equilateral triangle.

It will be apparent from an inspection of the figures of the drawing that the thread or wire 56 is held taut, whatever be its position, by reason of the presence of the tension spring 58.

Any suitable tension device may be substituted for the spring 58 or for the springs 54.

In the use of the device embodying my invention and which is illustrated in Figs. 3 to 8 inclusive, the model which represents the dental arch which is to be studied and treated is placed underneath the plate 26 with its base resting upon the plate 20 and so that the thread or wire 51 is situated between the two main incisors. The plate 26 should be adjusted to a position as near as practicable to the tops of the teeth of the model.

The threads or wires 52 are then adjusted at equal angles with the thread or wire 51 and also so that they follow as nearly as practicable the buccal sides of the lateral teeth.

By moving the model to and fro, I am able to find two homologous teeth that are intersected at homologous points by the said threads or wires 52. Then by comparing the lateral teeth with the said cords I am enabled to determine with definiteness and accuracy whether or not both sides of the dental arch are arranged at the same angle with respect to its median plane.

If the two sides of the arch do not extend in the same angular direction with respect to the median plane, I am enabled also to determine which side has deviated or is malposed, and whether deviation or malposition is in a lingual or in a buccal direction.

The horizontal thread or wire 56 is then moved back and forth over the plate 26, being kept at all times parallel to the base of the triangle, and by noting whether or not the said thread or wire either is at the same distance above the crowns or tops of all of the teeth or if it intersects them and such intersections are at equal distances from the tops or crowns of the same, it may be determined whether or not the teeth upon opposite sides of the arch occupy the same plane.

It will be understood, of course, that in making this test the plate 26 should be adjusted in a horizontal position.

If by study and examination of the model with my instrument it be found that the threads or wires 52 when moved toward and from the median thread or wire 51 intersects homologous teeth at homologous points and that when the thread or wire 56 is moved toward and from the vertex point 45 it also intersects homologous teeth at homologous points, the demonstration is complete that the arch is symmetrical.

It is apparent that if the arch is not symmetrical that fact would also be demonstrated as well as the direction and extent of deviation and malposition of the individual teeth of the arch.

It is of very great advantage to be able to adjust the threads or wires 52 toward and from the median thread or wire 51 for the reason that it enables an investigator to place the said threads or wires 52 into closer relation to the teeth upon opposite sides of the median plane of the arch and thereby to judge more accurately of their positions relative thereto.

The presence of the lines at the curved edge of the plate 26 enables the positioning of the threads or wires 52 in exactly corresponding positions and the presence of the horizontal lines upon the said plate parallel to the base of the equilateral triangle heretofore referred to enables the placing of the horizontal thread or wire 56 in exactly parallel relation to the base of said triangle and to the base of the triangular opening 40.

Having thus described my invention, I claim:—

1. A symmetroscope including a plate having an opening therethrough and having a plurality of lines each of which is connected at one end to the same point on said plate and the said lines forming an acute angle with each other, means for movably connecting the opposite ends of said lines to the said plate, said plate also having a median line secured thereto bisecting the angle between said first mentioned lines, a horizontal line intersecting the lines aforesaid, said horizontal line being at a right angle to the median line, means for movably connecting said horizontal line to said plate, and means for supporting the said plate in operative relation to a model of a dental arch.

2. A symmetroscope including a plate having an opening therethrough, threads or wires secured at a common point to said plate and extending at an acute angle with respect to each other therefrom, means movably connecting the opposite ends of said lines to said plate, a thread or wire intersecting the first-named threads or wires and forming therewith an isosceles triangle, means for movably connecting the said intersecting line to said plate, a stationary median thread or wire coincident with the median line of said triangle, and means for supporting said plate in operative relation to a model of a dental arch.

3. In a symmetroscope, the combination of a base member for supporting a model of a dental arch, a plate, means for supporting the said plate in position above the said base, the said plate having an opening therethrough, a stationary thread or wire extending across said opening and movable threads or wires also extending across said opening and forming equal angles with the stationary thread or wire on opposite sides thereof and a movable thread or wire connected to said plate and extending across said stationary thread or wire and the said movable threads or wires and adapted to be placed at right angles to the former, the said threads or wires being for comparison with a dental arch for determining whether it is symmetrical or asymmetrical.

4. In a symmetroscope, the combination of a base, a plate thereon having an equilateral triangular opening therethrough, means for supporting the said plate in position above said base, threads or wires connected to the said plate at a point where the lateral sides of the said triangular opening would meet if extended, and the opposite ends of the said threads being movably connected to the said plate, a median line bisecting the said triangular opening in said plate and forming equal angles with the two threads or wires which are located upon opposite sides thereof, and a thread or wire movably connected to the said plate and extending across said opening parallel to the base of the same and at right angles to the said stationary thread or wire, the said threads or wires being for comparison with a dental arch to determine whether it is symmetrical or asymmetrical.

5. In a symmetroscope, the combination of a base, a plate having means thereon for the purpose stated, posts upon the said base for supporting the said plate, and springs extending between and frictionally engaging pairs of posts to hold the said plate in adjusted position thereon.

6. In a symmetroscope, the combination of a base, a plate provided with means thereon for the purpose stated, posts on the said base for supporting said plate, opposing pairs of posts being provided with grooves therein which face each other and spring wires having connection with said plate and the opposite ends of which engage in the said groove for supporting the said plate in adjusted positions on said posts.

7. In a symmetroscope, the combination of a base adapted for supporting a model of a dental arch, a plate situated above the said base and being provided with means for comparison with the teeth in the said arch to determine whether those upon one side of the median plane are symmetrical with respect to those upon the opposite side or whether they are asymmetrical, posts for supporting the said plate, opposing posts being provided with grooves which face each other and wire springs having connection with said plate and also having bent ends which engage in the said slots for holding the said plate in adjusted position above the model upon said base.

8. In a symmetroscope, the combination of a base, posts secured thereon, a plate having holes therethrough through which the said posts project, means for holding the said plate in adjusted position upon said posts and the said plate being provided with an opening therethrough through which a model of a dental arch supported upon the said base may be examined, a stationary thread or wire secured to said plate and extending across said opening, threads or wires connected to said plate at a point in alinement with said stationary thread or wire and extending from their point of connection upon opposite sides of said stationary wire and forming equal angles therewith, the opposite ends of said threads or wires having connection with hooks which engage an edge of the said plate which is curved upon the arc of a circle concentric with the point of connection of the said threads to the said plate, and a movable thread or wire having hooks connected to its opposite ends which engage opposite edges of said plate and which thread or wire extends transversely of the threads or wires hereinbefore mentioned, and means upon the said plate for indicating when the said transversely extending thread or wire is at right angles to the stationary median thread or wire.

9. A dental device comprising a flat sheet member having lines thereon arranged in couples and extending angularly with respect to each other from a single point, the lines of the respective couples forming acute angles with each other, and also having a line bisecting the angles formed by the lines of the respective couples, and means for supporting the said member in different positions above a model of a dental arch whereby the teeth of such arch may be compared with the said lines for the purpose stated.

10. A symmetroscope including, in combination, a plate, means for supporting the same in operative relation to a dental arch, the said plate having lines thereon radiating from a common point and one of which is centrally located with respect to corresponding lines on opposite sides thereof, said corresponding lines forming equal angles with said central line, and the said plate also having lines thereon at right angles to the said central line, and threads or wires respectively connected at one end to said plate at a point co-incident with the point from which the said first-mentioned lines radiate, means for so connecting the said ends of the threads or wires to the said plate, means for securing the opposite end of one of the said threads or wires to the said plate to hold it in position in alinement with and directly over the said central line, means for adjustably connecting the opposite ends of the other threads or wires to said plate, their position with respect to the central thread or wire being ascertained by comparison with the lines on said plate on opposite sides of the said central line, a thread or wire extending in transverse relation to the first-named threads or wires, means for adjustably connecting the said thread or wire to the said plate, and its position with respect to the said first-named threads or wires being ascertained by comparison with the lines which are arranged on the said plate at right angles to the said central line.

11. A symmetroscope comprising a base, a plate provided with means thereon for the purpose stated, means on said base for supporting said plate, opposing pairs of said last-named means being provided with grooves, and yielding means secured to said plate and engaging within said grooves to support said plate in any desired position.

12. A symmetroscope including a base, a plate supported on said base and having an opening therethrough and having a plurality of means each of which is connected at one end to the same point on said plate and the said means forming an acute angle with each other, means for movably connecting the opposite ends of said means to said plate, said plate also having means secured thereto coincident with a median plane bisecting the angle between the first mentioned means, and the said plate also having a horizontal means connected thereto and intersecting the previously mentioned means and being at a right angle to the means coincident with the median plane, and means for adjustably supporting the said plate in operative relation to said base.

13. In a symmetroscope, the combination of a base member, a plate having means thereon for the purpose stated, posts upon the said base member for supporting the said plate, and springs having connection with said plate and extending between and frictionally engaging pairs of said posts to hold the said plate in adjusted position thereon.

14. In a symmetroscope, the combination of a base member, a plate provided with means for comparison with the model of a dental arch to determine whether such arch is symmetrical or asymmetrical, said plate having a plurality of holes therein, posts extending through said holes, and means having adjustable engagement with said posts for supporting said plate in adjusted positions.

15. A device of the character described comprising a plate having a triangular opening therein and having indicating marks thereon adjacent to the edges of said opening for the purpose stated, a base member, means extending upwardly from said base member for adjustably supporting the said plate above the said member, and intersecting movable means having connection with the said plate for coöperation with the said indicating marks for the purpose stated.

In testimony that I claim the foregoing as my invention, I have hereunto signed my name this sixth day of January, A. D. 1912, at Berlin, Germany.

JOSEF GRÜNBERG.

In the presence of—
MICHAEL NOWICKI,
ANTON BARCZYNSKI.

Copies of this patent may be obtained for five cents each, by addressing the "Commissioner of Patents, Washington, D. C."